United States Patent
Okamatsu et al.

(10) Patent No.: US 11,602,909 B2
(45) Date of Patent: Mar. 14, 2023

(54) TIRE SEALANT AND TIRE REPAIR KIT

(71) Applicant: THE YOKOHAMA RUBBER CO., LTD., Tokyo (JP)

(72) Inventors: Takahiro Okamatsu, Hiratsuka (JP); Masahiro Naruse, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1102 days.

(21) Appl. No.: 16/316,148

(22) PCT Filed: Jul. 24, 2017

(86) PCT No.: PCT/JP2017/026686
§ 371 (c)(1),
(2) Date: Jan. 8, 2019

(87) PCT Pub. No.: WO2018/021239
PCT Pub. Date: Feb. 1, 2018

(65) Prior Publication Data
US 2020/0086594 A1    Mar. 19, 2020

(30) Foreign Application Priority Data

Jul. 25, 2016 (JP) .............................. JP2016-145513

(51) Int. Cl.
| | | |
|---|---|---|
| *B29C 73/16* | (2006.01) | |
| *C08L 7/02* | (2006.01) | |
| *B29C 73/02* | (2006.01) | |
| *C08K 5/053* | (2006.01) | |
| *C08K 5/06* | (2006.01) | |
| *C08K 5/17* | (2006.01) | |
| *C08L 23/08* | (2006.01) | |
| *C08L 31/04* | (2006.01) | |
| *C08L 83/04* | (2006.01) | |

(52) U.S. Cl.
CPC .......... *B29C 73/163* (2013.01); *B29C 73/025* (2013.01); *C08K 5/053* (2013.01); *C08K 5/06* (2013.01); *C08K 5/175* (2013.01); *C08L 7/02* (2013.01); *C08L 23/08* (2013.01); *C08L 31/04* (2013.01); *C08L 83/04* (2013.01); *C08L 2205/025* (2013.01)

(58) Field of Classification Search
CPC . C08L 7/02; C08L 31/04; C08K 5/175; B29C 73/163
USPC .......................................................... 523/166
See application file for complete search history.

(56) References Cited

U.S. PATENT DOCUMENTS

| | | | | |
|---|---|---|---|---|
| 8,791,175 B2 * | 7/2014 | Okamatsu | ............... | C08L 33/26 524/386 |
| 11,104,087 B2 * | 8/2021 | Okamatsu | ............. | B29C 73/163 |
| 2011/0086944 A1 | 4/2011 | Schunack et al. | | |
| 2014/0202987 A1 | 7/2014 | Nakata et al. | | |

FOREIGN PATENT DOCUMENTS

| | | | | |
|---|---|---|---|---|
| DE | 10 2008 007 992 A1 | 8/2009 | | |
| JP | 2011-162681 A | 8/2011 | | |
| JP | 2015101597 A | 6/2015 | | |
| JP | 2016-98355 A * | 5/2016 | ............... | C09K 3/10 |
| JP | 2016-098355 A | 5/2016 | | |
| KR | 20150086934 A | 7/2015 | | |
| WO | 2013002283 A1 | 1/2013 | | |
| WO | 2015/089754 A1 | 6/2015 | | |

OTHER PUBLICATIONS

JP 2016-98355 A (May 30, 2016); machine translation. (Year: 2016).*
Office Action issued to the corresponding German Patent Application No. 112017003733.6 dated Feb. 26, 2021 and a partial translation thereof.
Office Action dated Sep. 17, 2019 issued to the corresponding Japanese Patent Application No. 2016-145513.

* cited by examiner

*Primary Examiner* — Rip A Lee
(74) *Attorney, Agent, or Firm* — Carrier Shende & Associates, P.C.; Joseph P. Carrier; Anne G. Sabourin

(57) ABSTRACT

An object of the present invention is to provide a tire sealant and a tire repair kit that exhibit excellent injectability. Provided is a tire sealant including a natural rubber latex, a synthetic resin emulsion, an anti-freezing agent, a surfactant, and a chelating agent, wherein the content of the chelating agent is 0.1 mass % or greater.

12 Claims, No Drawings

TIRE SEALANT AND TIRE REPAIR KIT

TECHNICAL FIELD

The present invention relates to a tire sealant and a tire repair kit.

BACKGROUND ART

In recent years, there has been an increase in instances where a puncture repair kit is introduced as a standard equipment or an optional equipment in a vehicle. For the puncture repair kit, a configuration is known in which a tire sealant and a compressor and the like are bundled and provided in a compact package.

Upon puncture of a tire, a puncture repair kit is used, the tire sealant is injected into the tire via the tire valve by using a compressor or the like, and thereby the tire can travel again.

For example, Patent Document 1 proposes a product including a natural rubber latex, a synthetic resin emulsion, and an anti-freezing agent as the tire sealant.

Patent Document 1 describes a tire sealant including a natural rubber latex, an ethylene-vinyl acetate resin emulsion, a polyolefin emulsion, and an anti-freezing agent, wherein the mass ratio of the solid contents of the natural rubber latex to the ethylene-vinyl acetate resin emulsion (natural rubber/ethylene-vinyl acetate resin) is from 15/85 to 80/20, and the solid content of the polyolefin emulsion is from 0.5 to 10 parts by mass per 100 parts by mass of the total solid contents of the natural rubber latex and the ethylene-vinyl acetate resin emulsion.

CITATION LIST

Patent Literature

Patent Document 1: JP 2011-162681 A

SUMMARY OF INVENTION

Technical Problem

Under such circumstances, the present inventors prepared a tire sealant including a natural rubber latex, a synthetic resin emulsion, an anti-freezing agent, and a surfactant with reference to Patent Document 1, evaluated the tire sealant, and found that the injectability of such a tire sealant may be further improved.

Therefore, an object of the present invention is to provide a tire sealant having excellent injectability.

Another object of the present invention is to provide a tire repair kit.

Solution to Problem

As a result of diligent research to solve the above problem, the present inventors found that a desired effect can be achieved by a tire sealant including a natural rubber latex, a synthetic resin emulsion, an anti-freezing agent, a surfactant, and a chelating agent, wherein the content of the chelating agent is in the specific range, and thus achieved the present invention.

The present invention is based on the findings described above and, specifically, solves the problem described above by the following features.

1. A tire sealant including:
   a natural rubber latex;
   a synthetic resin emulsion;
   an anti-freezing agent;
   a surfactant; and
   a chelating agent, wherein
   a content of the chelating agent is 0.1 mass % or greater.
2. The tire sealant according to 1 described above, wherein the chelating agent is an amino carboxylic acid-based compound.
3. The tire sealant according to 1 or 2 described above, wherein the chelating agent is at least one selected from the group consisting of ethylenediamine tetraacetic acid, diethylenetriamine pentaacetic acid and metal salts thereof.
4. The tire sealant according to any one of 1 to 3 described above, wherein the synthetic resin emulsion is at least one selected from the group consisting of an ethylene-vinyl acetate copolymer emulsion, an ethylene-vinyl acetate-VeoVA copolymer emulsion, a vinyl acetate homopolymer emulsion, and a polysilicone emulsion.
5. The tire sealant according to any one of 1 to 4 described above, wherein the anti-freezing agent is at least one selected from the group consisting of ethylene glycol, propylene glycol, diethylene glycol and glycerin.
6. The tire sealant according to any one of 1 to 5 described above, wherein content 1 of a solid content of the natural rubber latex is from 15 to 85 mass % of the total amount of the content 1 and content 2 of a solid content of the synthetic resin emulsion.
7. A tire repair kit including the tire sealant described in any one of 1 to 6 described above and a compressor.

Advantageous Effects of Invention

The tire sealant according to the present invention has excellent injectability.

The tire repair kit according to the present invention has excellent injectability of a tire sealant.

DESCRIPTION OF EMBODIMENTS

Embodiments of the present invention are described in detail below.

Note that, in this specification, "(meth)acryl" refers to "acryl" or "methacryl".

Also note that, in the present specification, numerical ranges indicated using "(from) . . . to . . . " include the former number as the lower limit value and the later number as the upper limit value.

In the present specification, unless otherwise noted, a single corresponding substance may be used for each component, or a combination of two or more types of corresponding substances may be used for each component. In a case where a component includes two or more types of substances, the content of the component means the total content of the two or more types of substances.

In an embodiment of the present invention, a natural rubber latex includes natural rubber as a dispersoid and a dispersion medium, and the natural rubber is dispersed in the dispersion medium. A synthetic resin emulsion includes a dispersion medium and a synthetic resin as a dispersoid, and the synthetic resin is dispersed in the dispersion medium. In an embodiment of the present invention, an emulsion is a concept including a suspension (a system in which a solid phase dispersoid is dispersed in a liquid phase dispersion medium) and a system in which a liquid phase dispersoid is dispersed in a liquid phase dispersion medium.

The dispersion medium included in the natural rubber latex and the synthetic resin emulsion is not particularly limited. Examples of the dispersion medium include water, and a mixture of water and an organic solvent that is soluble in water.

In an embodiment of the present invention, the solid content of the natural rubber latex refers to natural rubber. The solid content of the natural rubber latex refers to the content of the natural rubber included in the natural rubber latex, or the total content of components other than the dispersion medium in the natural rubber latex. In an embodiment of the present invention, the content of the natural rubber included in the natural rubber latex is almost the same as the total content of components other than the dispersion medium in the natural rubber latex.

In an embodiment of the present invention, the solid content of the synthetic resin emulsion refers to a synthetic resin. The solid content of the synthetic resin emulsion refers to the content of the synthetic resin included in the synthetic resin emulsion, or the total content of components other than the dispersion medium in the synthetic resin emulsion. In an embodiment of the present invention, the content of the synthetic resin included in the synthetic resin emulsion and the total content of components other than the dispersion medium of the synthetic resin emulsion are almost the same.

Tire Sealant

The tire sealant according to an embodiment of the present invention includes a natural rubber latex, a synthetic resin emulsion, an anti-freezing agent, a surfactant, and a chelating agent, wherein the content of the chelating agent is 0.1 mass % or greater.

Note that the content of the chelating agent is mass % relative to the total amount of the tire sealant.

The tire sealant according to an embodiment of the present invention has such a configuration, and therefore desired effects can be achieved. Although the reason is not clear, it is assumed to be as follows.

As described above, the tire sealant is normally injected into the tire through the tire valve by using a compressor or the like. The present inventors found that dispersion of the natural rubber as a dispersoid of the tire sealant becomes unstable during the injection, and this may deteriorate the injectability of the tire sealant into the tire.

The present inventors presumed that such deterioration may be caused by a polyvalent cation in the tire sealant (for example, a metal ion such as $Ca^{2+}$, $Mg^{2+}$, and $Zn^{2+}$) which inhibits the function of the surfactant. Such a polyvalent cation is considered to be present in the natural rubber latex and the synthetic resin emulsion.

In an embodiment of the present invention, the inventors found that the dispersion of the natural rubber is stabilized in the tire sealant by blending a chelating agent and also by setting the content of the chelating agent in a specific range.

It is conceived that the chelating agent in the tire sealant blocks the polyvalent cation and prevents the polyvalent cation from inhibiting the function of the surfactant, and thereby facilitating the contribution of the surfactant to the dispersion of the dispersoid (for example, natural rubber). This allows the tire sealant to be efficiently injected into the tire (excellent injectability) in an embodiment of the present invention.

Hereinafter, each component included in the tire sealant according to an embodiment of the present invention will be described.

Natural Rubber Latex

The natural rubber latex included in the tire sealant according to an embodiment of the present invention is not particularly limited. Examples of the natural rubber latex include a natural rubber latex from which protein is not removed, a natural rubber latex from which protein is removed, and a natural rubber latex including a polyvalent cation (for example, metal ions such as $Ca^{2+}$, $Mg^{2+}$, and $Zn^{2+}$).

The method of producing the natural rubber latex is not particularly limited.

Synthetic Resin Emulsion

The synthetic resin emulsion included in the tire sealant according to an embodiment of the present invention is not particularly limited.

Examples of the synthetic resin emulsion include a vinyl acetate polymer emulsion and a polysilicone emulsion.

The vinyl acetate polymer emulsion is not particularly limited as long as the vinyl acetate polymer included in the emulsion is a polymer having a repeating unit derived from a vinyl acetate.

The polysilicone emulsion is not particularly limited as long as the polysilicone included in the emulsion is a polymer having a siloxane backbone.

An example of a preferable aspect of the synthetic resin emulsion is a vinyl acetate polymer emulsion.

Vinyl Acetate Polymer Emulsion

The vinyl acetate polymer included in the vinyl acetate polymer emulsion may be either a homopolymer or a copolymer of vinyl acetate.

In a case where the vinyl acetate polymer is a copolymer, the monomer other than vinyl acetate is not particularly limited as long as the monomer is a compound having an ethylenic unsaturated bond. Examples of the monomer include olefins such as ethylene; VeoVAs (esters of versatic acid and vinyl alcohol); (meth)acrylic monomers such as a (meth)acrylic ester and (meth)acrylic acid; and aromatic vinyl compounds such as styrene.

Examples of the vinyl acetate polymer emulsion includes a vinyl acetate homopolymer emulsion and a vinyl acetate copolymer emulsion.

Examples of the vinyl acetate copolymer emulsion include ethylene-vinyl acetate-based copolymer emulsions such as an ethylene-vinyl acetate copolymer emulsion, an ethylene-vinyl acetate-VeoVA copolymer emulsion, and an ethylene-vinyl acetate-VeoVA-(meth)acrylic monomer copolymer emulsion.

The synthetic resin emulsion is preferably at least one selected from the group consisting of a vinyl acetate polymer emulsion and a polysilicone emulsion, and more preferably at least one selected from the group consisting of an ethylene-vinyl acetate copolymer emulsion, an ethylene-vinyl acetate-VeoVA copolymer emulsion, a vinyl acetate homopolymer emulsion, and a polysilicone emulsion from the perspective of excellent injectability and storage stability The method of producing the synthetic resin emulsion is not particularly limited. Commercially available products can be used as a synthetic resin emulsion.

Total of Content 1 of Solid Content of Natural Rubber Latex and Content 2 of Solid Content of Synthetic Resin Emulsion The total of content 1 of solid content of the natural rubber latex and content 2 of solid content of the synthetic resin emulsion is preferably from 15 to 45 mass %, and more preferably from 15 to 40 mass % of the total amount of the tire sealant from the perspective of excellent injectability and storage stability.

Content 1 of Solid Content of Natural Rubber Latex

The content 1 of solid content of the natural rubber latex is preferably from 15 to 85 mass %, and more preferably from 30 to 80 mass % of the total of content 1 of solid content of the natural rubber latex and content 2 of solid content of the synthetic resin emulsion from the perspective of excellent injectability and puncture seal performance (also referred to as sealing property).

Content of Water Included in Tire Sealant

The water content (total amount of water) in the tire sealant according to an embodiment of the present invention is preferably from 20 to 60 mass %, and more preferably from 25 to 50 mass % of the total amount of the tire sealant from the perspective of excellent injectability and latex stability.

Anti-Freezing Agent

The anti-freezing agent included in the tire sealant according to an embodiment of the present invention is not particularly limited as long as it can be ordinary blended in the tire sealant.

Among these, the anti-freezing agent is preferably at least one selected from the group consisting of ethylene glycol, propylene glycol, diethylene glycol and glycerin from the perspective of excellent injectability and storage stability.

The content of the anti-freezing agent is preferably from 20 to 55 mass % of the total amount of water and the anti-freezing agent included in the tire sealant according to an embodiment of the present invention from the perspective of excellent injectability and stability at low temperatures.

Chelating Agent

The tire sealant according to an embodiment of the present invention includes a chelating agent.

The chelating agent is a compound having a plurality of coordinating atoms per molecule.

The coordinating atom of the chelating agent is not particularly limited.

The chelating agent may be a metal salt or a hydrate. In a case where the chelating agent is a metal salt, examples of counterions constituting the metal salt include alkali metal ions such as a sodium ion and a potassium ion, and an ammonium ion ($NH_4^+$).

Examples of the chelating agent include an amino carboxylic acid-based compound and an organic phosphonic acid-based compound.

The chelating agent is preferably an amino carboxylic acid-based compound from the perspective of excellent injectability and storage stability.

The amino carboxylic acid-based compound is not particularly limited as long as it is a compound having a nitrogen atom and a carboxy group.

An example of a preferable aspect is one in which the nitrogen atom constitutes a tertiary amine. In a case where the amino carboxylic acid-based compound has a plurality of nitrogen atoms, at least one or all of nitrogen atoms may constitute a tertiary amine.

The chelating agent preferably includes a plurality of nitrogen atoms, and more preferably from 2 to 4 nitrogen atoms per molecule.

A part or all of the carboxy groups of the chelating agent may form a salt with the counter ion.

The chelating agent preferably includes a plurality of carboxy groups, and more preferably from 2 to 4 carboxy groups per molecule.

The nitrogen atom or the carboxy group can be bonded to an organic group. The organic group is not limited. Examples of the organic group include a hydrocarbon group that may have a heteroatom.

The hydrocarbon group is not particularly limited. Examples of the hydrocarbon group include an aliphatic hydrocarbon group (including straight-chain, branched chain, and cyclic), an aromatic hydrocarbon group, and combinations thereof. The hydrocarbon group may have an unsaturated bond.

The heteroatom is not particularly limited. Examples of the hetero atom include an oxygen atom, a nitrogen atom, and a sulfur atom and halogen. The hetero atom may be bonded to another hetero atom, a carbon atom, or a hydrogen atom to form a functional group.

Examples of the amino carboxylic acid-based compound having one nitrogen atom include aspartic acid-based compounds such as aspartic acid diacetate; glutamic acid-based compounds such as glutamic acid diacetate; and metal salts thereof.

Examples of the amino carboxylic acid-based compound having two nitrogen atoms include alkylene diamine carboxylic acid-based compounds such as ethylenediamine tetraacetic acid, ethylenediamine diacetic acid, ethylenediamine dipropionic acid, diaminopropanetetraacetic acid, hexamethylenediamine tetraacetic acid, or metal salts thereof.

Examples of the amino carboxylic acid-based compound having three nitrogen atoms include dialkylene triamine carboxylic acid-based compounds such as diethylenetriamine pentaacetic acid or metal salts thereof.

Examples of the amino carboxylic acid-based compound having four nitrogen atoms include trialkylenetetramine carboxylic acid-based compounds such as triethylenetetraminehexaacetic acid or metal salts thereof.

Among these, the chelating agent is preferably at least one selected from the group consisting of ethylenediamine tetraacetic acid, diethylenetriamine pentaacetic acid, and metal salts thereof from the perspective of excellent injectability and storage stability Examples of the metal salt include sodium salt.

Content of Chelating Agent

In an embodiment of the present invention, the content of the chelating agent is 0.1 mass % or greater of the total amount of the tire sealant. The tire sealant with the content of the chelating agent in this range exhibits excellent injectability.

The content of the chelating agent is preferably from 0.1 to 10 mass %, and more preferably from 0.1 to 5 mass % of the total amount of the tire sealant from the perspective of excellent injectability and storage stability.

In the present invention, the chelating agent may be bonded to a polyvalent cation (for example, coordinate bonding and hydrogen bonding) to form a complex (chelate).

An example of a preferable aspect of the polyvalent cation that can react with the chelating agent to form a complex is a metal cation. The polyvalent cation is a di- or higher valent cation, and a preferable aspect of the polyvalent cation is, for example, a divalent to tetravalent cation.

Examples of the polyvalent cation include divalent metal cations such as $Ca^{2+}$, $Mg^{2+}$, and $Zn^{2+}$.

The polyvalent cation may be derived from any components included in the tire sealant according to an embodiment of the present invention. Examples of the polyvalent cation include one included in the natural rubber latex or the synthetic resin emulsion.

The tire sealant according to an embodiment of the present invention may include a complex formed by the chelating agent.

Surfactant

The surfactant included in the tire sealant according to an embodiment of the present invention is not particularly limited. Examples of the surfactant include a nonionic surfactant, an anionic surfactant, a cationic surfactant, and an amphoteric surfactant. Note that in an embodiment of the present invention, the surfactant includes no chelating agent.

Examples of the non-ionic surfactant include polyoxyethylene alkyl ether, polyoxyethylene alkyl phenyl ether, polyoxyethylene alkylamine, polyoxyethylenealkylamide, polyoxyethylene fatty acid ester, polyoxyethylene castor oil, polyoxyethylene rosin ester, polyoxyethylene lanolin ether, polyoxyethylene polyhydric alcohol ether, polyoxyethylene polyhydric alcohol fatty acid ester, polyhydric alcohol fatty acid ester, and fatty acid alkanolamide non-ionic surfactants. The HLB of the non-ionic surfactant is preferably from 12.0 to 19.0.

The HLB refers to a value calculated by the Oda's equation based on the organic conceptual diagram and this calculation method is described in, for example, "Techniques of Emulsification and Solubilization" (1976, Kougakutosho Ltd.) Further, the organic value and the inorganic value for determining the HLB can be calculated by using the inorganic table (1974, the values reported by Fujita and others) described in "Organic Conceptional Diagram, Fundamentals and Applications" (1984, Sankyo Publishing).

Examples of the polyoxyethylene alkyl ether include a polyoxyethylene decyl ether, a polyoxyethylene lauryl ether, a polyoxyethylenecetyl ether, a polyoxyethylene stearyl ether, a polyoxyethylene oleyl ether, a polyoxyethylene 2-ethylhexyl ether, a polyoxyethyleneisodecyl ether, a polyoxyethylene tridecyl ether, and a polyoxyethyleneisostearyl ether.

Examples of the anionic surfactant include alkyl sulfates (for example, sodium lauryl sulfate), alkyl ether sulfates, polyoxyethylene alkyl ether sulfates, polyoxyethylene alkyl phenyl ether sulfates, alkylbenzene sulfonates, alkylnaphthalene sulfonates, salts of higher fatty acids (soaps), α-sulfo fatty acid methyl ester salts, α-olefin sulfonates, alkane sulfonates, (mono) alkyl phosphates, polyoxy-mono and di-styryl phenylether monoester sulfosuccinates, and alkyl phenoxy polyoxyethylene propyl sulfonates.

Examples of the cationic surfactant include tetraalkyl ammonium chloride, trialkyl benzyl ammonium chloride, an alkylamine, a monooxyethylene alkylamine, and a polyoxyethylene alkylamine.

The surfactant preferably includes a non-ionic surfactant and an anionic surfactant from the perspective of excellent injectability into the tire, sealing property, and storage performance.

In a case where the nonionic surfactant and the anionic surfactant are used in combination, the mass ratio of the nonionic surfactant to the anionic surfactant (nonionic surfactant/anionic surfactant) is preferably from 1.0/1.0 to 1.0/10.0. The tire sealant with the mass ratio in this range exhibits excellent injectability into the tire, sealing property, and storage performance.

The amount of the surfactant (in a case where the surfactant is used in combination, the total amount) is from 1.0 to 6.0 parts by mass per 100 parts by mass of the solid content 1 of the natural rubber latex from the perspective of excellent injectability into the tire, sealing property, and storage performance.

Other Components

In addition to the components described above, the tire sealant according to an embodiment of the present invention can optionally include additives such as gelling agents, fillers, anti-aging agents, antioxidants, pigments, plasticizers, thixotropic agents, UV absorbents, flame retardants, dispersants, dehydrating agents, and antistatic agents.

Production Method

The method of producing the tire sealant according to an embodiment of the present invention is not particularly limited. Examples of the method include sufficiently mixing a natural rubber latex, a synthetic resin emulsion, an anti-freezing agent, a surfactant, a chelating agent, and optionally an additive by using a mixer such as a combination mixer under reduced pressure.

Water may be further added to the system as necessary.

The temperature at which the tire sealant according to an embodiment of the present invention is used is not particularly limited, and the tire sealant according to an embodiment of the present invention can be used in a wide temperature range. The temperature at which the tire sealant according to an embodiment of the present invention is used may be, for example, from −40 to +70° C.

Tire Repair Kit

The tire repair kit according to an embodiment of the present invention includes the tire sealant according to an embodiment of the present invention and a compressor.

The tire sealant used in the tire repair kit according to an embodiment of the present invention is not particularly limited as long as it is the tire sealant according to an embodiment of the present invention.

The compressor used in the tire repair kit according to an embodiment of the present invention is not particularly limited. Examples thereof include an air compressor. The compressor may be a compressor that has a small capacity and uses a power source from a cigar lighter socket.

EXAMPLES

The present invention is described below in detail using examples but the present invention is not limited to such examples.

Production of Tire Sealant

The components shown in Table 1 below were used in compositions (part by mass) shown in the same table and mixed by an agitator to produce a tire sealant.

Evaluation

The following evaluations were performed for the tire sealants produced as described above. The results are shown in Table 1.

Injectability at +70° C.

Evaluation Method 350 mL of the puncture sealant produced as described above was heated to 70° C., and then injected into a tire having a size of 215/60R16 (having a puncture hole of 4 mm in diameter in a shoulder groove portion of a tread) via a valve under a condition of injection pressure of 400 kPa by using an air compressor. The duration from the injection start to the injection completion was measured.

Evaluation Criteria

In a case where the injection time is within 40 seconds, the injectability is excellent.

In a case where the injection time is within 30 seconds, the injectability is more excellent.

Puncture Repair Distance: Evaluation of Sealing Property

Evaluation Method

A puncture hole (diameter: 4 mm) was made in the shoulder groove portion of the tread of the tire having a size of 215/60R16.

The punctured tire was mounted on a drum testing machine, 350 mL of the tire sealant produced as described above was injected via the tire valve core, and the tire was then filled with air until the pressure inside the tire reached 200 kPa.

The tire was then subjected to intermittent driving, in which the tire was subjected to driving at a speed of 30 km/h under a load of 350 kg and then stopped repeatedly. The intermittent driving was carried out until there was no air permeation observed. The travel distance required for tire puncture repair (puncture repair distance) was determined. Soapy water was sprayed to the part of the puncture hole and the presence of the air leakage was confirmed based on whether the soapy water produced foam.

Evaluation Criteria

In a case where the puncture repair distance is within 6 km, sealing property is excellent.

Chelating agent 1: EDTA (ethylenediamine tetraacetic acid, trade name, Dissolvine Z, available from Lion Specialty Chemicals Co., Ltd.)

Chelating agent 2: Ethylenediamine tetraacetic acid-disodium salt-dihydrate (trade name, Dissolvine Na2-S, available from Lion Specialty Chemicals Co., Ltd.)

Chelating agent 3: Diethylene triamine pentaacetic acid-penta sodium salt (trade name, Dissolvine D, available from Lion Specialty Chemicals Co., Ltd.)

Synthetic resin emulsion 1: Ethylene-vinyl acetate copolymer resin emulsion (Sumikaflex 400HQ, available from SumikaChemtex Co., Ltd., solid content: approximately 55 mass %, ethylene-vinyl acetate copolymer, Tg=0° C.)

Anti-freezing agent 1: Propylene glycol (industrial propylene glycol, available from Adeka Corporation)

As is clear from the results shown in Table 1, the tire sealant of Comparative Example 1 which included no chelating agent exhibited poor injectability.

In contrast, the tire sealant according to an embodiment of the present invention exhibited excellent injectability.

In particular, the tire sealant of Example 4 which included from 0.2 to 0.4 mass % of the chelating agent 2 relative to the total amount of the tire sealant exhibited most excellent injectability.

Comparing Examples 3 to 5, the tire sealant of Example 3 in which the content of the chelating agent was 0.2 mass % or less of the total amount of the tire sealant exhibited superior puncture seal performance compared to the tire sealants of Examples 4 and 5 in which the content was

TABLE 1

| Table 1 | Comparative Example 1 | Examples 1 | 2 | 3 | 4 | 5 | 6 | 7 |
|---|---|---|---|---|---|---|---|---|
| Water | 16.5 | 16.5 | 16.5 | 16.5 | 16.5 | 16.5 | 16.5 | 16.5 |
| NR latex 1 | 33.7 | 33.7 | 33.7 | 33.7 | 33.7 | 33.7 | 33.7 | 33.7 |
| (Content of solid content of NR latex 1) | (20.6) | (20.6) | (20.6) | (20.6) | (20.6) | (20.6) | (20.6) | (20.6) |
| Surfactant 1 | 0.41 | 0.41 | 0.41 | 0.41 | 0.41 | 0.41 | 0.41 | 0.41 |
| Surfactant 2 | 0.41 | 0.41 | 0.41 | 0.41 | 0.41 | 0.41 | 0.41 | 0.41 |
| Chelating agent 1 | | 0.1 | 0.5 | | | | | |
| (Content of chelating agent 1 relative to total amount of tire sealant: mass %) | | (0.1) | (0.5) | | | | | |
| Chelating agent 2 | | | | 0.1 | 0.3 | 0.5 | | |
| (Content of chelating agent 2 relative to total amount of tire sealant: mass %) | | | | (0.1) | (0.3) | (0.5) | | |
| Chelating agent 3 | | | | | | | 0.1 | 0.3 |
| (Content of chelating agent 3 relative to total amount of tire sealant: mass %) | | | | | | | (0.1) | (0.3) |
| Synthetic resin emulsion 1 | 9.575 | 9.575 | 9.575 | 9.575 | 9.575 | 9.575 | 9.575 | 9.575 |
| (Content of solid content of synthetic resin emulsion 1) | (5.27) | (5.27) | (5.27) | (5.27) | (5.27) | (5.27) | (5.27) | (5.27) |
| Anti-freezing agent 1 | 39.45 | 39.45 | 39.45 | 39.45 | 39.45 | 39.45 | 39.45 | 39.45 |
| Total | 100.045 | 100.145 | 100.545 | 100.145 | 100.345 | 100.545 | 100.145 | 100.345 |
| Injectability at +70° C. (second) | 45 | 25 | 25 | 23 | 17 | 27 | 24 | 27 |
| Puncture repair distance (km) | — | 3.5 | 4.5 | 4.5 | 6.0 | 6.0 | 4.5 | 6.0 |

Details of the components described in Table 1 are as follows.

Water: distilled water

NR latex 1: Natural rubber latex (trade name, Hytex HA, available from Golden Hope Co. Ltd., solid content: 61 mass %, includes polyvalent metal cation)

Surfactant 1: Anionic surfactant, sodium lauryl sulfate (trade name, Emal 10PT, available from Kao Corporation)

Surfactant 2: Non-ionic surfactant, polyoxyethylene oleyl ether (Emulgen 430 (E430), available from Kao Corporation, HLB=16.9)

greater than 0.2 mass %. Similar results were also obtained in the comparison between Examples 1 and 2 and the comparison between Examples 6 and 7.

The invention claimed is:

1. A tire sealant comprising:
   a natural rubber latex;
   a synthetic resin emulsion;
   an anti-freezing agent;
   a surfactant; and
   a chelating agent, wherein the chelating agent is an amino carboxylic acid-based compound, and a content of the chelating agent is 0.1 mass % or greater.

2. The tire sealant according to claim 1, wherein the chelating agent is at least one selected from the group consisting of ethylenediamine tetraacetic acid, diethylenetriamine pentaacetic acid, and metal salts thereof.

3. The tire sealant according to claim 1, wherein the synthetic resin emulsion is at least one selected from the group consisting of an ethylene-vinyl acetate copolymer emulsion, an ethylene-vinyl acetate-VeoVA copolymer emulsion, a vinyl acetate homopolymer emulsion, and a polysilicone emulsion.

4. The tire sealant according to claim 1, wherein the anti-freezing agent is at least one selected from the group consisting of ethylene glycol, propylene glycol, diethylene glycol, and glycerin.

5. The tire sealant according to claim 1, wherein content 1 of solid content of the natural rubber latex is from 15 to 85 mass % of the total of the content 1 and content 2 of solid content of the synthetic resin emulsion.

6. A tire repair kit comprising the tire sealant described in claim 1 and a compressor.

7. The tire sealant according to claim 2, wherein the synthetic resin emulsion is at least one selected from the group consisting of an ethylene-vinyl acetate copolymer emulsion, an ethylene-vinyl acetate-VeoVA copolymer emulsion, a vinyl acetate homopolymer emulsion, and a polysilicone emulsion.

8. The tire sealant according to claim 2, wherein the anti-freezing agent is at least one selected from the group consisting of ethylene glycol, propylene glycol, diethylene glycol, and glycerin.

9. The tire sealant according to claim 2, wherein content 1 of solid content of the natural rubber latex is from 15 to 85 mass % of the total of the content 1 and content 2 of solid content of the synthetic resin emulsion.

10. The tire sealant according to claim 3, wherein the anti-freezing agent is at least one selected from the group consisting of ethylene glycol, propylene glycol, diethylene glycol, and glycerin.

11. The tire sealant according to claim 3, wherein content 1 of solid content of the natural rubber latex is from 15 to 85 mass % of the total of the content 1 and content 2 of solid content of the synthetic resin emulsion.

12. The tire sealant according to claim 4, wherein content 1 of solid content of the natural rubber latex is from 15 to 85 mass % of the total of the content 1 and content 2 of solid content of the synthetic resin emulsion.

* * * * *